United States Patent [19]

Al-Attar

[11] Patent Number: 5,351,204
[45] Date of Patent: Sep. 27, 1994

[54] SCALING SYSTEM AND METHOD FOR AN ELECTRONIC COMPASS

[75] Inventor: Rafi A. Al-Attar, Troy, Mich.

[73] Assignee: Chrysler Corporation, Highland Park, Mich.

[21] Appl. No.: 815,347

[22] Filed: Dec. 27, 1991

[51] Int. Cl.⁵ ............................................. G01C 17/38
[52] U.S. Cl. ............................ 364/571.03; 364/559; 364/457; 73/1 E; 33/356
[58] Field of Search ............. 364/559, 571.01, 571.03, 364/457; 73/1 E; 33/363 Q, 363 R, 355 R, 356, 361

[56] References Cited

U.S. PATENT DOCUMENTS

| | | | |
|---|---|---|---|
| 3,899,834 | 8/1975 | Harrison, Jr. | 33/352 |
| 3,991,361 | 11/1976 | Mattern et al. | 324/244 |
| 4,412,387 | 11/1983 | Lenko | 33/361 |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,622,646 | 11/1986 | Waller et al. | 364/571.02 |
| 4,622,843 | 11/1986 | Hormel | 73/1 E |
| 4,677,381 | 6/1987 | Geerlings | 324/253 |
| 4,698,912 | 10/1987 | Fowler et al. | 33/356 |
| 4,750,349 | 6/1988 | Luitje | 73/1 E |
| 4,807,462 | 2/1989 | Al-Attar | 73/1 E |

FOREIGN PATENT DOCUMENTS 60-135814  7/1985  Japan .
2056686  3/1981  United Kingdom .

Primary Examiner—Thomas G. Black
Assistant Examiner—Michael Zanelli
Attorney, Agent, or Firm—Mark P. Calcatterra

[57] ABSTRACT

A scaling system and technique which employs an analog-to-digital converter having at least 10-bit accuracy and a ranging circuit to compensate for abnormally large vehicle magnetic fields. The ranging circuit employs variable resistance negative feedback, which enables an electronic compass system to reduce the output voltage of an integrator to within the fixed output voltage range of the integrator. An analog-to-digital converter of at least 10-bit accuracy makes resolution of heading information possible and enhances the accuracy of subsequently performed calibrations.

2 Claims, 3 Drawing Sheets $\vec{V_N} = \vec{V} + \vec{V_c}$

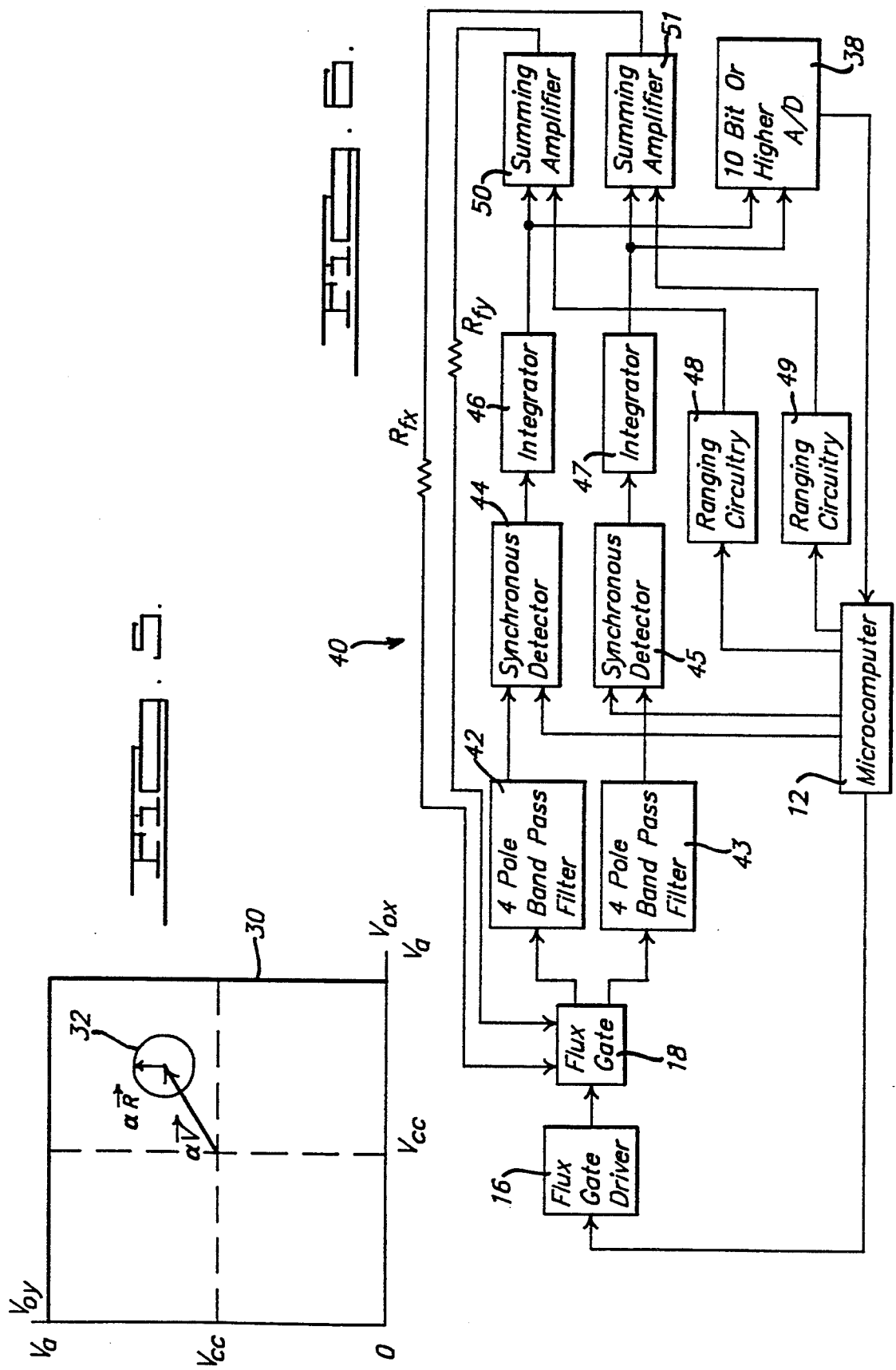

SCALING SYSTEM AND METHOD FOR AN ELECTRONIC COMPASS

CROSS-REFERENCE TO RELATED APPLICATIONS

The present application is related to the following, co-pending applications filed concurrently herewith:

"Shifting System And Method For An Electronic Compass System", application Ser. No. 07/815,267;

"Data Processing Method For An Electronic Compass System", application Ser. No. 07/815,266;

"Heading Computation For An Electronic Compass", application Ser. No. 07/815,346;

"Magnetic Transient Detection And Calibration Technique For An Auto-Calibrating Compass", application Ser. No. 07/815,268;

"Method For Selecting Calibration Data For An Auto-Calibrating Compass", application Ser. No. 07/815,264;

"Flux-Gate Sensor Orientation Method", application Ser. No. 07/815,265;

"Noise Removal Method For An Electronic Compass", application Ser. No. 07/815,269;

"Flux-Gate Sensor Mounting And Method", application Ser. No. 07/815,270;

"A Method For Interpreting Magnetic Direction For A Compass On A Vehicle", application Ser. No. 07/815,274.

The disclosures of all the applications cited above are hereby incorporated by reference and made a part hereof the same as if fully set forth herein.

BACKGROUND OF THE INVENTION

1. Technical Field

The present invention relates to electronic compasses, and more specifically to a circuit and method for compensating for excess vehicle magnetic fields in an electronic compass.

2. Discussion

The present invention is related to and is an improvement of U.S. Pat. No. 4,622,843 to Hormel issued Nov. 18, 1986 entitled "Simplified Calibration Technique and Auto Ranging Circuit for an Electronic Compass Control Circuit". The present invention is also related to U.S. Pat. No. 4,807,462 issued Feb. 28, 1989, to Rafi A. Al-Attar and entitled "Method for Performing Automatic Calibrations in an Electronic Compass." These patents are hereby incorporated by reference. The present invention is related to and combinable with the commonly assigned patent application "Shifting System and Method for an Electronic Compass," Ser. No. 07/815,267.This application is hereby incorporated by reference.

Normally, electronic compass systems employ a magnetic flux-gate sensor. The operation of the flux-gate sensor is well documented. See, Hisatsugu Itoh, "Magnetic Yield Sensor and Its Application to Automobiles", SAE Paper No. 800123, pages 83–90, February, 1980; and Doug Garner, "A Magnetic Heading Reference for the Electro/Fluidic Autopilot," Sport Aviation, Part I, pages 19–26, November, 1981 and Part II, pages 20–32, 51, December, 1981. These documents are hereby incorporated by reference.

Electronic compasses are capable of processing ordinary vehicle and earth magnetic fields. In the '843 patent to Hormel, the output of an integrator is summed with the output of a ranging circuit and the sum is fed back to the flux-gate sensor. The feedback current reduces the output voltage of the flux-gate sensor, and consequently the integrator, until feedback current is equal in magnitude but opposite in direction to the current in the sense coils produced by the earth and vehicle magnetic field.

However, the primary purpose of the ranging circuit is to bring the output of the integrator into a range that the analog-to-digital IC can resolve clearly. Therefore, the ranging circuit is not capable of compensating for abnormally large vehicle magnetic fields, making the geometric method of calibration found in the '462 and '843 patents difficult to perform. The feedback current is limited by the resolving power of the analog-to-digital converter, where resolving power is defined as the ability of the analog-to-digital converter to partition an analog signal into distinct voltage ranges and assign a different value to each range. The feedback current is also limited by the size of the feedback resistors, and the inherent feedback limitations of the ranging circuit.

SUMMARY OF THE INVENTION

In accordance with the teachings of the present invention, an electronic compass system employing a scaling compensation circuit is provided. The electronic compass system includes a microcomputer, a flux-gate, a flux-gate driver, a multiplexer, a bandpass filter, a synchronous detector, an integrator, and a summing amplifier. The scaling compensation circuit employs an analog-to-digital converter having at least 10-bit accuracy and a ranging circuit. The ranging circuit employs variable resistance negative feedback, which enables the electronic compass system to reduce the voltage at the flux-gate, and consequently the integrator, to within the allowable output voltage range of the integrator for large vehicle magnetic fields. Since decreasing the feedback current also decreases the output voltages of the integrator, an analog-to-digital converter of at least 10-bit accuracy makes resolution of heading information from the integrator output possible. Thus, the scaling compensation system enhances the accuracy of the subsequently performed calibration method found in the '462 and '843 patents.

BRIEF DESCRIPTION OF THE DRAWINGS

Other objects and advantages will become apparent upon reading the following detailed description and upon reference to the drawings, in which:

FIG. 4 is a block diagram of a preferred embodiment of a compass system employing the scaling compensation system of the present invention.

FIG. 5 is a depiction of the same window as FIG. 3, but showing the vehicle's magnetic field voltage vector $\vec{V}$ and the earth's magnetic field voltage vector $\vec{R}$ after compensation in accordance with the method of the present invention; and FIG. 6 is a block diagram of an alternative preferred embodiment of the present invention.

DETAILED DESCRIPTION OF THE PREFERRED EMBODIMENT

Figure 1:
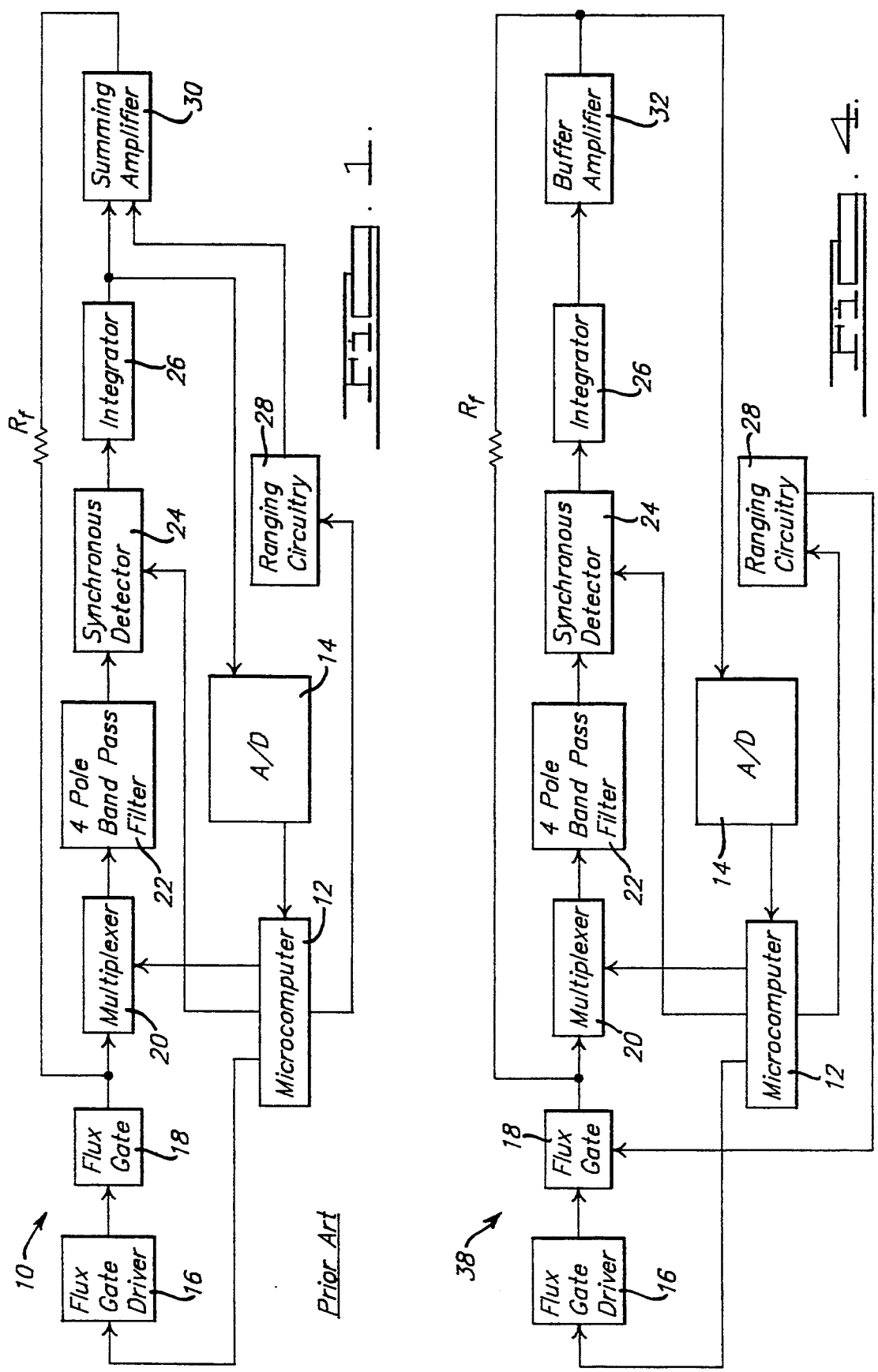
FIG. 1 is a block diagram of the electronic compass disclosed in the '843 patent to Hormel.

Turning now to FIG. 1, there is shown a block diagram of the electronic compass system 10 of the '843 patent to Hormel. The heart of the system is a microcomputer 12 which employs an 8-bit analog-to-digital converter 14. The microcomputer 12 controls operation of the electronic compass system 10, beginning with a flux-gate driver 16. Upon receipt of a square-wave signal from the microcomputer 12, the flux-gate driver 16 adds enough drive to the signal to saturate a flux-gate 18. The operation of the flux-gate driver 16 and flux-gate 18 are explained in the documents incorporated by reference, namely "A Magnetic Heading Reference for the Electro/Fluidic Autopilot" and "Magnetic Field Sensor and its Application to Automobiles, (SAE Paper No. 800123)". The flux-gate 18 employs two sense coils oriented perpendicularly to one another. Voltages are induced across the sensor coils by the presence of the magnetic fields of the vehicle and the earth.

The voltages from the sense coils of the flux-gate 18 are selected by a multiplexer 20. The multiplexer 20 is in communication with the microcomputer 12, which generates a signal for controlling a network for switching use of a four-pole bandpass filter 22, a synchronous detector 24 and an integrator 26 periodically from one sense coil to the other. The multiplexer 20 is in communication with the four-pole bandpass filter 22, which filters out all but the second harmonic signals, whose amplitude is proportional to the earth's magnetic field. Second harmonic signals are presented to the synchronous detector 24. The function of the synchronous detector 24 is to select the portion of the filtered signals to be integrated by the integrator 26. The output of the synchronous detector 24 is a half-wave rectified signal which is fed into the integrator 26.

The output of the integrator 26 periodically switches back and forth between two DG levels corresponding to the two sense coils of the flux-gate 18. Integrator output is stabilized by feeding back a current through resistor $R_f$ to the sense coils of the flux-gate 18. The feedback current eventually generates an equal and opposite magnetic field versus that produced by the magnetic field sensed by the flux-gate 18. Therefore, the output voltages, $V_{ox}$ and $V_{oy}$, of the integrator 26 are directly proportional to the sensed magnetic field by a constant $R_f$ which is the feedback resistance:

$$V_{ox} = KR_f(\vec{V}_{mx} + \vec{R}_{mx}).$$

where $\vec{V}_{mx} + \vec{R}_{mx}$ is the geometric addition (or resultant) of the magnetic fields of the earth and the vehicle in the x coil. K is a constant. Similarly, $$V_{oy} = KR_f(\vec{V}_{my} + \vec{R}_{my})$$

where $\vec{V}_{my} + \vec{R}_{my}$ is the geometric resultant at the magnetic field, of the earth and vehicle in the y coil, and K is a constant related to the physical characteristics of the flux-gate 18, such as its number of turns, permeability, and the gain of the filter 22 and integrator 26.

The ranging circuit 28 used in the '843 patent to Hormel moves the DC levels at the integrator output closer to the origin and toward a magnitude within the window. The ranging circuit 28 generates a compensation field such that $$\vec{V}_n + \vec{R} = \vec{V} + \vec{R} + \vec{V}_c \text{ or}$$

$$\vec{V}_n = \vec{V} + \vec{V}_c$$

where $\vec{V}_n$ is the new vehicle magnetic field vector voltage, $\vec{R}$ is earth's magnetic field voltage, and $\vec{V}_c$ is the compensation field vector voltage.

Heading information is determined from the output of the integrator 26. The microcomputer 12 is coupled to the integrator output through the 8-bit analog-to-digital converter 14. The 8-bit analog-to-digital converter 14 converts the DC levels to digital codes (i.e., coordinates) referenced to a cartesian coordinate system. The microcomputer 12 divides the y-coordinate, corresponding to the DG level from one coil, by the x-coordinate, corresponding to the other coil, and takes the arctangent of the quotient using a piece-wise-linear-function-of-x routine to yield the vehicle's heading. Galibratton is then performed under the method of the '462 patent.

The integrator 26 employs operational amplifiers which have voltage output ranges of approximately O to $V_a$ volts. In the '843 patent to Hormel, the voltage output range is approximately 0 to 10 volts. Since the voltages induced across the sense coils of the flux-gate 18 may be negative or positive, these voltages must be modified for use in the integrator 26. Negative voltages are modified by tying the sense coils of the flux-gate 18, the bandpass filter 22 reference voltage and the integrator 26 reference point to a reference voltage of $V_{cc}$, halfway between O and $V_a$ volts. In the '843 patent to Hormel, $V_{cc}$ is equal to 5 volts.

The magnitude of the voltage outputs of the integrator 26 are indirectly reduced to some extent by the operation of a ranging circuit 28. However, the primary purpose of the ranging circuit 28 is to bring the DC output levels of the integrator 26 into a range that the A/D can resolve for all headings, not to compensate for abnormally large vehicle magnetic fields. It accomplishes this through the use of negative feedback through resistor $R_f$. The ranging circuit 28 monitors integrator output and employs a variable voltage source, having an operational amplifier, to produce feedback. The outputs of the integrator 26 and ranging circuit 28 are combined in a summing amplifier 30.

Figure 2:
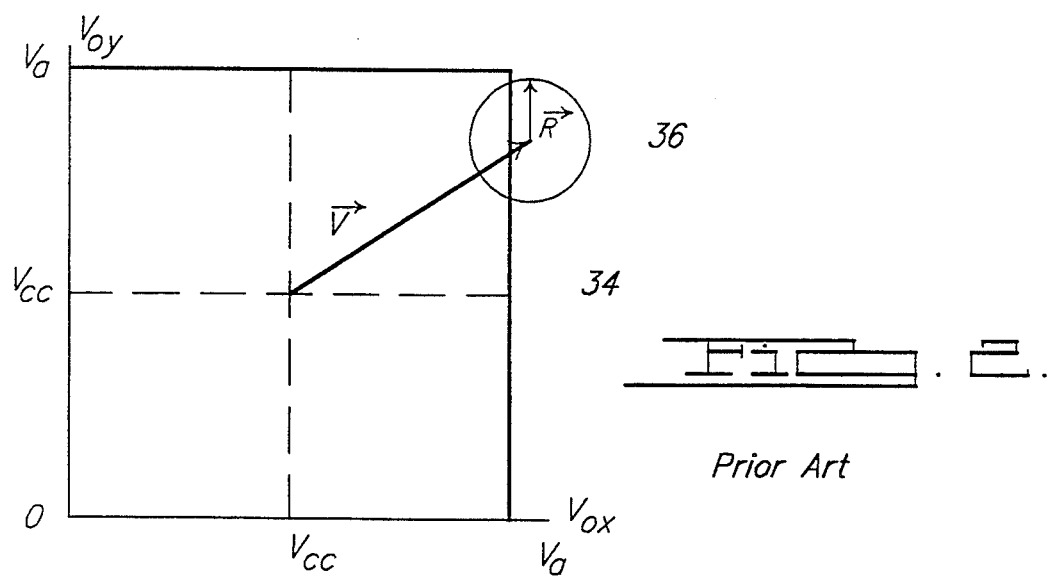
FIG. 2 is a depiction of the operational amplifier output voltage range or "window" of the electronic compass system in the '843 patent to Hormel, showing the vehicle's magnetic field voltage vector $\vec{V}$ and the earth's magnetic field voltage vector $\vec{R}$ before compensation.

Turning now to FIG. 2, there is shown a voltage window 30. The x and y axes correspond to the two DC output levels $V_{ox}$ and $V_{oy}$ of the integrator 26. The limits of the window 30 are determined by the output voltage range of the operational amplifiers within the integrator 26. This range is depicted as approximately O to $V_a$ volts. The voltage $V_{cc}$ is applied to the junction of the two sense coils, the bandpass filter 22 and the integrator 26 and marks a reference for the origin O of the vehicle's magnetic field vector voltage $\vec{V}$.

Also shown is the earth's magnetic field vector voltage $\vec{R}$ and circle 32. The earth's magnetic field circle 32 is the locus of points described by the earth's magnetic field vector voltage $\vec{R}$ as the vehicle changes heading. The vehicle's magnetic field vector voltage $\vec{V}$ remains stationary with respect to the x and y axes, which are the frame of reference of the vehicle (and the flux-gate 18).

Figure 3A:
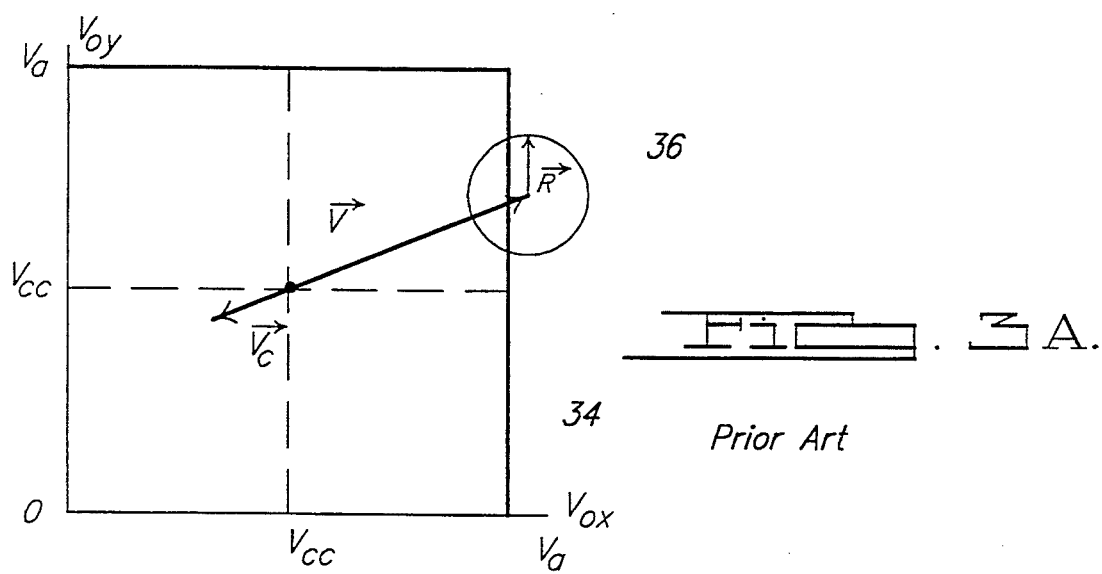
FIG. 3a is a depiction of the window of FIG. 2, but showing the compensation voltage vector $\vec{V}_c$.
Figure 3B:
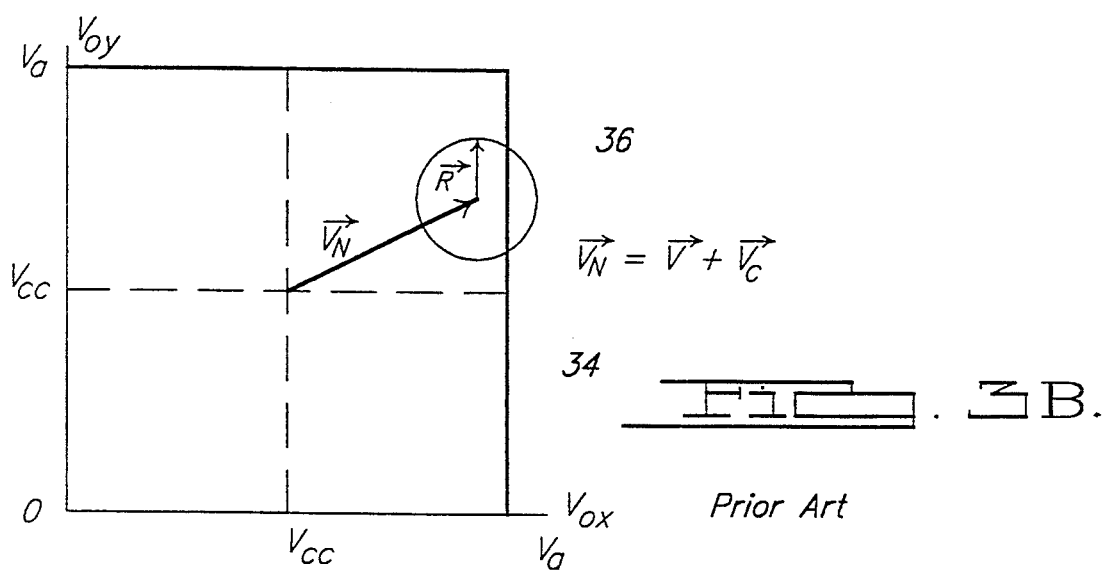
FIG. 3b is a depiction of the window of FIG. 3a, but showing the resultant of the compensation voltage vector $\vec{V}_c$ and the vehicle's and the earth's magnetic field voltage vectors $\vec{V}$ and $\vec{R}$.

In FIGS. 3a and 3b there is shown the window 30 of FIG. 2 However, the earth's magnetic field circle 32 has been brought partially into the window 30 by the operation of the ranging circuit 28 of the electronic compass of FIG. 1. The magnetic compensation vector voltage $\vec{V}_c$ is added to the vehicle's magnetic field vector voltage $\vec{V}$ to produce a new vehicle magnetic field vector voltage $\vec{V}_n$. The earth's magnetic field vector voltage $\vec{R}$ remains the same as before compensation.

The ranging circuit 28 in FIG. 1 is incapable of producing enough feedback current to bring the earth's magnetic field circle 32 totally within the window 30. When abnormally large vehicle magnetic fields are present, part of the earth's field circle 32 remains outside the voltage window 30 after compensation. For vehicle headings in which the earth's magnetic field vector voltage $\vec{R}$ crosses the boundaries of the window 30, the microcomputer 12 is incapable of generating accurate headings. If the earth's magnetic field circle 32 were totally outside the window 30 after compensation, then the microcomputer 12 would be incapable of generating any accurate headings, because the operational amplifiers of the integrator 26 would be in constant saturation. Thus, calibration under the method of the '462 and '843 patents would be difficult.

Turning now to FIG. 4, there is shown the improved electronic compass system 34 of the present invention. The system 34 and new method of compensation employed therein change the DC output levels by changing the amount of feedback resistance $R_f$, thereby bringing the voltage across the sense coils to within the output voltage range of the integrator 26. This resistance is made variable to accommodate variations in magnetic fields among vehicles. It may be preset when the electronic compass system is installed in a vehicle and would be accessible to service personnel if a particular vehicle's magnetic field were to later change.

As shown in FIG. 5, feedback resistance $R_f$ produces a scaling effect. As the feedback resistance $R_f$ increases, the DC output levels of integrator 26 increase. Reducing feedback resistance $R_f$ also reduces the magnitudes of both the vehicle's magnetic field vector voltage $\vec{V}$ and the earth's magnetic field vector voltage $\vec{R}$ at the output of the integrator 26. The decrease in feedback resistance $R_f$ brings the entire earth's field circle 32 within the window of the integrator 26. Advantageously, vectors, $\vec{V}$ and $\vec{R}$ can be scaled up or down by a factor $\alpha$ that is proportional to feedback resistance $R_f$. For a fixed value of $R_f$, $$V_{ox} = KR_f(\vec{V}_{mx} + \vec{R}_{mx}) \qquad (1)$$

$$V_{oy} = KR_f(\vec{V}_{my} + \vec{R}_{my}) \qquad (2)$$

Under the method of the present invention, $$V_{ox\ new} = K\alpha R_f(\vec{V}_{mx} + \vec{R}_{mx})$$

$$V_{oy\ new} = K\alpha R_f(\vec{V}_{my} + \vec{R}_{my})$$

or $$V_{ox\ new} = \alpha V_{ox}$$

$$V_{oy\ new} = \alpha V_{oy}$$

Therefore, $\vec{V} + \vec{R}$ will become $\alpha\vec{V} + \alpha\vec{R}$ after changing the feedback resistance $R_f$ by a factor $\alpha$. In FIG. 5, the factor $\alpha$ is less than 1 and the vectors $\vec{V}$ and $\vec{R}$ are scaled down.

Since a decrease in feedback resistance $R_f$ reduces the effects of both the earth's magnetic field vector voltage $\vec{R}$ and the vehicle's magnetic field vector voltage $\vec{V}$, the DC output levels of the integrator 26 are incapable of being accurately resolved by the 8-bit analog-to-digital converter 14. Therefore, the present invention of FIG. 4 employs a 10-bit analog-to-digital converter 38. Of course, other analog-to-digital converters of greater resolving power are also envisioned by this invention. A commercially available 10-bit analog-to-digital converter is the model 68HC68A2 manufactured by RCA. Advantageously, the present invention makes calibration under the method of the '462 and '843 patents possible for abnormally large vehicle magnetic fields.

Except for the feedback resistance $R_f$ and the analog-to-digital converter 14, the elements of the compass system 10 of FIG. 1 are identical with those of the compass system 34 of FIG. 4. However, as shown in FIG. 6, the present invention is not limited to vehicles and is also envisioned for use in unmultiplexed electronic compasses employing separate feedback resistances and paths, one for each coil. The sensed magnetic field in each coil may be processed separately, using bandpass filters 42 and 43, synchronous detectors 44 and 45, integrators 46 and 47, ranging circuits 48 and 49, feedback resistances $R_{fx}$ and $R_{fy}$, and summing amplifiers 50 and 51.

Although the invention has been described with particular reference to certain preferred embodiments thereof, variations and modifications can be effected within the spirit and scope of the following claims.

What is claimed is:

1. A scaling compensation method for use in a vehicle electronic compass control circuit that includes a microcomputer, a flux-gate having an output voltage dependent upon a strength of the earth's magnetic field and a magnetic field of the vehicle incorporating the electronic compass control circuit and their direction, and an integrator having a fixed output voltage range and producing an output containing heading information; the control circuit employing a scaling compensation circuit that includes a multi-bit analog-to-digital converter coupled between the output of said integrator and said microcomputer and a ranging circuit, said ranging circuit employing variable resistance negative feedback connected to the output of said integrator, said electronic compass adapted to determine vehicle heading as a function of the earth's magnetic field wherein the earth's magnetic field is distorted by the magnetic field of the vehicle, said scaling compensation method comprising:

(a) monitoring said integrator output for 360° of vehicle headings;
  (b) partitioning said integrator output into a predetermined number of discrete ranges;
  (c) converting the discrete ranges into digital values;
  (d) counting the number of digital values and comparing the number to a predetermined number of digital values;
  (e) decreasing the resistance of said variable resistance negative feedback to a predetermined level and decreasing the number of discrete ranges if the digital value is less than or equal to the predetermined number of digital values; and (f) converting said digital values into digital vehicle heading information.

2. A vehicle electronic compass control system comprising:

- a microcomputer;
- a magnetic field sensor having an output voltage dependent upon a strength of the earth's magnetic field, a magnetic field of the vehicle incorporating the electronic compass control circuit and their direction;
- an integrator having a fixed output voltage range and producing an output containing heading information;
- a multi-bit analog-to-digital converter coupled between the output of said integrator and said microcomputer;
- a ranging circuit connected to the output of the integrator and employing variable resistance negative feedback, wherein said electronic compass is adapted to determine vehicle heading as a function of the earth's magnetic field which is distorted by the magnetic field of the vehicle;
- monitoring means for monitoring said integrator output for 360° of vehicle headings;
- partitioning means for partitioning said integrator output into a predetermined number of discrete ranges;
- converting means for converting the discrete ranges into digital values;
- counting means for counting the number of digital values and comparing the number to a predetermined number of digital values;
- decreasing means for decreasing the resistance of said variable resistance negative feedback to a predetermined level and decreasing the number of discrete ranges if the digital value is less than or equal to the predetermined number of digital values; and
- converting means for converting said digital values into digital vehicle heading information.

* * * * *